US006168188B1

(12) United States Patent
Preisler et al.

(10) Patent No.: US 6,168,188 B1
(45) Date of Patent: Jan. 2, 2001

(54) MOTOR VEHICLE INSTRUMENT PANEL HAVING INTEGRALLY HINGED AIR BAG DOOR

(75) Inventors: Darius J. Preisler, Macomb; Jason T. Murar, Clinton Township, both of MI (US)

(73) Assignee: Patent Holding Company, Fraser, MI (US)

( * ) Notice: Under 35 U.S.C. 154(b), the term of this patent shall be extended for 0 days.

(21) Appl. No.: 09/112,965

(22) Filed: Jul. 9, 1998

(51) Int. Cl.[7] ...................................................... B60R 21/20
(52) U.S. Cl. .......................................... 280/728.3; 280/752
(58) Field of Search ................................. 280/728.3, 732, 280/752

(56) References Cited

U.S. PATENT DOCUMENTS

| 5,445,410 | 8/1995 | Czapp et al. . | |
|---|---|---|---|
| 5,447,328 | 9/1995 | Iannazzi et al. . | |
| 5,458,361 | 10/1995 | Gajewski . | |
| 5,468,039 | 11/1995 | Matsumoto et al. . | |
| 5,522,616 | * 6/1996 | Bauer et al. | 280/732 |
| 5,549,324 | 8/1996 | Labrie et al. . | |
| 5,556,153 | 9/1996 | Kelman et al. . | |
| 5,564,515 | 10/1996 | Schambre . | |
| 5,584,502 | * 12/1996 | Phillion et al. | 280/728.3 |
| 5,590,903 | * 1/1997 | Phillion et al. | 280/728.3 |
| 5,639,116 | 6/1997 | Shimizu et al. . | |
| 5,685,930 | 11/1997 | Gallagher et al. . | |
| 5,709,358 | 1/1998 | Kuboto . | |
| 5,775,727 | * 7/1998 | Sun et al. | 280/728.3 |
| 5,806,880 | * 9/1998 | Gray | 280/728.3 |
| 5,863,064 | * 1/1999 | Rheinlander et al. | 280/732 |
| 5,915,724 | * 6/1999 | Daris et al. | 280/732 |

FOREIGN PATENT DOCUMENTS 4-185551 * 7/1992 (JP) ................................... 280/728.3

* cited by examiner

*Primary Examiner*—Kevin Hurley
*Assistant Examiner*—Lynda Jasmin
(74) *Attorney, Agent, or Firm*—Brooks & Kushman P.C.

(57) ABSTRACT

A molded instrument panel having a plastic front panel and incorporating an integral air bag door is disclosed wherein the air bag door is hinged to the front panel by overlapping integral plastic members to ensure that the door does not separate from the instrument panel during air bag deployment. The instrument panel also includes a plastic frame integrally formed on an inner surface of the front panel which together with the door, encloses an uninflated air bag. Preferably, the hinge and portions of the frame are formed by a pressurized fluid so as to be hollow, thereby facilitating swinging movement of the door while preventing sink marks on an outer surface of the front panel.

4 Claims, 3 Drawing Sheets

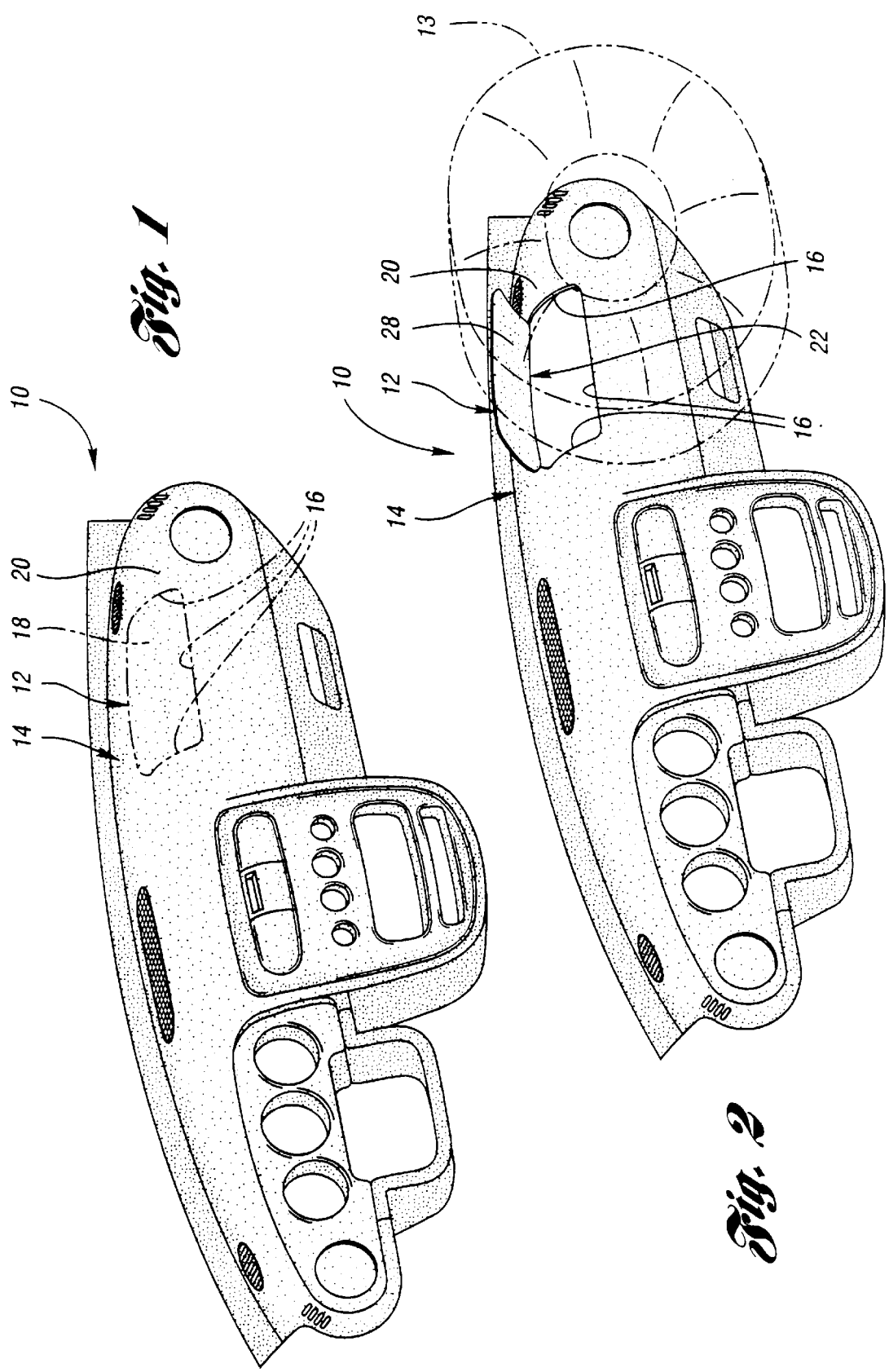

MOTOR VEHICLE INSTRUMENT PANEL HAVING INTEGRALLY HINGED AIR BAG DOOR

CROSS-REFERENCE TO RELATED APPLICATION

This application is related to co-pending U.S. patent application entitled "Mold For Use In A Gas-Assisted Injection Molding System And Gas Pin Assembly For Use Therein" filed on Sep. 22, 1997 and having U.S. Ser. No. 08/935,013.

TECHNICAL FIELD

This invention relates to motor vehicle instrument panels having air bag doors and, in particular, to motor vehicle instrument panels having integrally hinged air bag doors.

BACKGROUND ART

Most passenger-side air bag doors are formed in an air bag cover that is separate from the instrument panel. The plastics materials used to make a self-supporting instrument panel must have a certain degree of stiffness and high heat resistance to meet the requirements of its application but the materials that are currently available for such an instrument panel do not retain ductility and become embrittled at very low or cold temperatures which is unsuitable for air bag deployment.

Not only initial but also replacement costs for the instrument panel can be reduced, quality can be improved and styling can be enhanced by molding the instrument panel and the air bag cover including an integral air bag deployment door in one piece at the same time out of the same commercially available material.

U.S. Pat. No. 5,685,930 discloses a molded instrument panel having an integral air bag deployment door for a passenger side air bag. The door is hingedly connected to a vehicle structure to pivot within an opening in the panel. Also, a flexible tethering hinge retains a broken door portion to the vehicle structure.

U.S. Pat. No. 5,639,116 discloses an instrument panel with an integral air bag opening on the driver's side.

U.S. Pat. Nos. 5,564,515; 5,556,153; and 5,468,039 disclose molded instrument panels for motor vehicles per se.

U.S. Pat. No. 5,709,358; 5,549,324; 5,458,361; 5,447,328; and 5,445,410 disclose instrument panels having integral air bag openings.

DISCLOSURE OF INVENTION

An object of the present invention is to provide a plastic molded instrument panel including an integral air bag door hinged by at least one integral plastic member to ensure that the door does not separate from the rest of the instrument panel during air bag deployment.

Another object of the present invention is to provide a plastic molded instrument panel having an integral air bag door hinged to a front panel of the instrument panel to ensure that the door does not separate from the front panel during air bag deployment. In this way, the air bag cover is integrally formed with the instrument panel, thereby reducing not only initial but also replacement costs, quality is improved, and styling is enhanced.

In carrying out the above objects and other objects of the present invention, a motor vehicle instrument panel is provided. The instrument panel includes a plastic front panel having inner and outer surfaces and a plastic door adapted to enclose an uninflated air bag. The door also has inner and outer surfaces and is interconnected to the front panel at tear seams which allow deployment of the air bag. The instrument panel also includes a hinge including at least one plastic member extending between the front panel and the door for hingedly connecting the door to the front panel to allow the door to swing open and to ensure that the door does not separate from the front panel during air bag deployment.

Preferably, the at least one plastic member is integrally formed at the inner surfaces of the front panel and the door.

Also, preferably, the hinge includes a plurality of spaced plastic members hingedly connecting the front panel to the door.

Still preferably, the instrument panel further comprises a plastic frame integrally formed on the inner surface of the front panel to enclose the uninflated air bag.

Preferably, the hinge is formed by a pressurized fluid so that it is hollow and the outer surface of the front panel is sink free.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a schematic view of an instrument panel constructed in accordance with the present invention wherein an uninflated air bag is hidden from view behind a closed air bag door indicated by phantom lines;

FIG. 2 is a view similar to FIG. 1 wherein the air bag door is open and an inflated air bag is indicated by phantom lines;

BEST MODE FOR CARRYING OUT THE INVENTION

Figure 3:
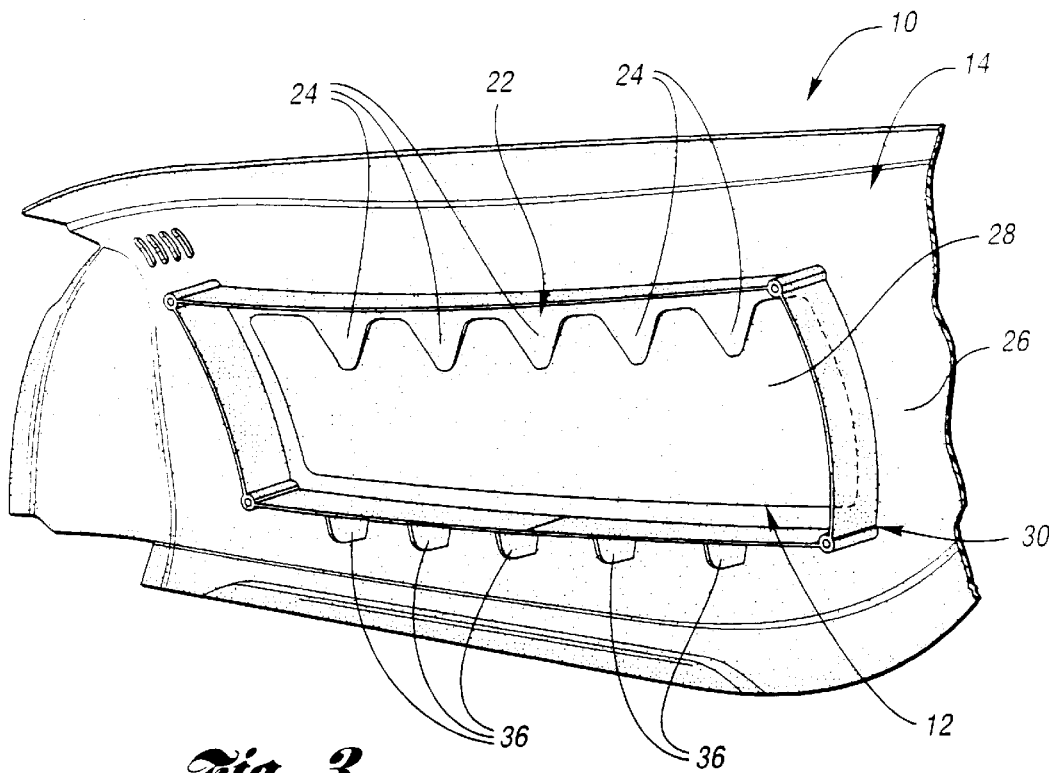
FIG. 3 is a rear perspective view, partially broken away, of an instrument panel constructed in accordance with the present invention with the air bag door closed.

Referring now to the drawing Figures, there is illustrated in FIGS. 1 and 2 schematic perspective views of an instrument panel, generally indicated at 10, including an integrally formed air bag door, generally indicated at 12, in its closed and open positions, respectively. An inflated air bag 13 is indicated by phantom lines in FIG. 2. The door 12 is connected to a plastic front panel, generally indicated at 14, of the instrument panel 10 at tear seams 16 which may be either visible or invisible in the closed position of the door 12 as indicated by phantom lines in FIG. 1. The instrument panel is preferably made from an injected plastic, such as Pulse 2000 available from Dow Chemical Co.

As indicated in FIG. 1, an outer surface 18 of the door 12 is coplanar with an outer surface 20 of the front panel 14 so one cannot tell if an uninflated air bag 13 is located beneath and is enclosed by the air bag door 14 when the tear seams 16 are invisible. Obviously, there are many ways of indicating that an uninflated air bag 13 lies beneath the air bag door 12 such as providing indicia on the outer surface 18 of the door 12.

Figure 4:
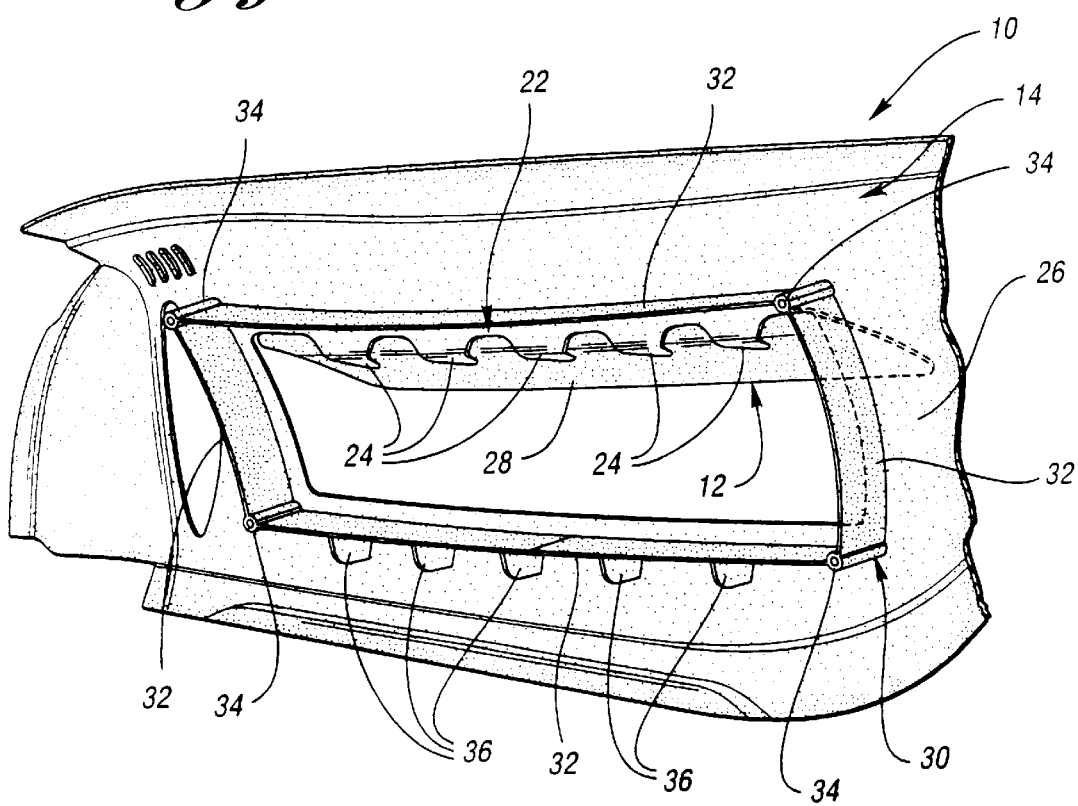
FIG. 4 is a view similar to the view of FIG. 3 with the air bag door open.

Referring now to FIGS. 3 and 4, the instrument panel 10 also includes a hollow plastic hinge, generally indicated at 22, preferably in the form of a plurality of spaced plastic members 24 which connect the front panel 14 to the door 12 at their inner surfaces 26 and 28, respectively. The hinge 22 in the form of the plastic members 24 extends between the front panel 14 and the door 12 at one edge thereof for hingedly connecting the door 12 to the front panel 14 to allow the door 12 to swing open, as illustrated in FIGS. 2 and 4, and to ensure that the door 12 does not separate from the front panel 14 during air bag deployment. Preferably, the hinge 22 is hollow as described hereinbelow. The plastic members 24 are plate-like and extend between, and in a direction generally parallel to, the front panel 14 and the door 12. The plastic members 24 do not break away from either the door 12 or the panel 14 during airbag deployment as illustrated in FIG. 4.

The instrument panel 10 also includes a plastic frame, generally indicated at 30, integrally formed on the inner surface 26 of the front panel 14 to enclose the uninflated air bag 13. The frame 30 typically includes a plurality of walls 32 having corner posts 34. The lowermost wall 32 is preferably supported by stiffening ribs 36 at the inner surface 26 of the panel 14.

Preferably, two of the posts 34 of the frame 30 are hollow as well as the hinge 22 to facilitate swinging movement of the door 12 and to prevent sink marks on the outer surface 20 of the front panel 14. Two hollow posts 34 of the frame 30 and the hollow hinge 22 are preferably formed by a pressurized fluid as described hereinbelow.

Figure 5:
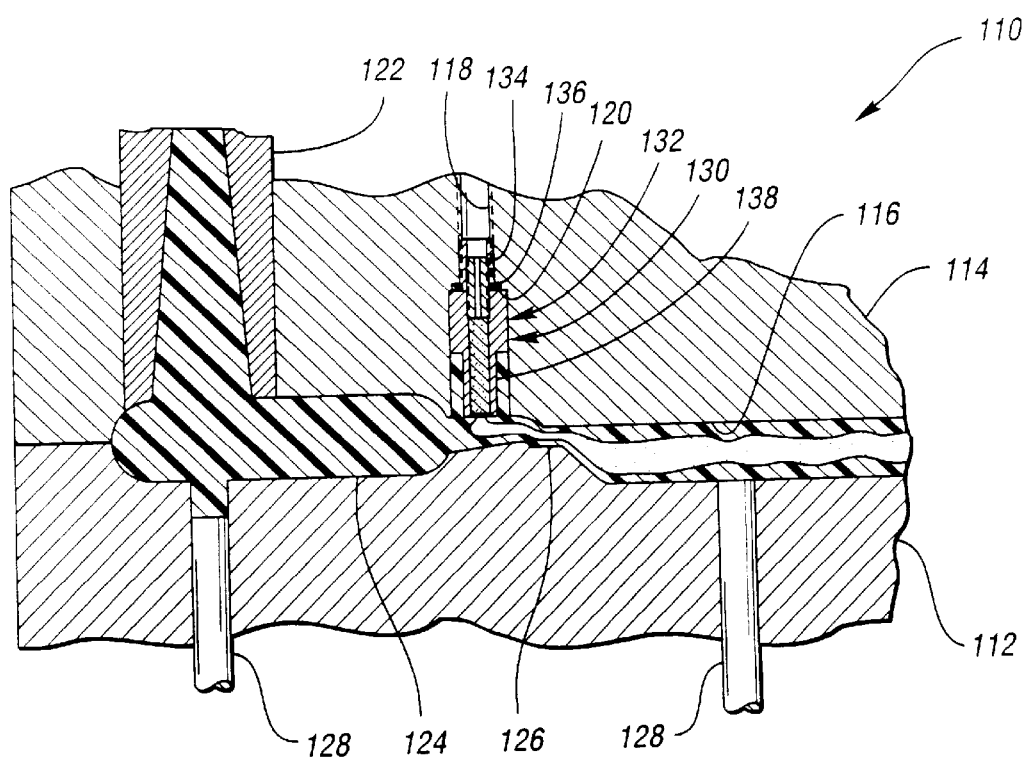
FIG. 5 is a view, partially broken away and in cross-section, of a mold showing a typical gas path through a shot of thermoplastic resin for making the instrument panel of the invention.

Referring now to FIG. 5, there is illustrated a mold, generally indicated at 110, for use in a gas-assisted injection molding system to form the instrument panel 10 with its hollow frame 30 and its hollow hinge 22. The mold 110 includes a first mold half 112 and a second mold half 114. The first and second mold halves 112 and 114, respectively, are movable relative to each other between an open position and a closed position as shown in FIG. 5, wherein the first and second mold halves 112 and 114, respectively, define an article-defining cavity 116.

The second mold half 114 includes a gas passageway 118 which extends from an exterior surface (not shown) of the second mold half 114 to an inner interior surface 120 of the second mold half 114 in fluid communication with the article-defining cavity 116.

The second or stationary mold half 114 includes a sprue 122 for communicating thermoplastic material to a runner 124 which, in turn, communicates with the article-defining cavity 116 via a gate 126. A thermoplastic flow path is defined by the sprue 122, the runner 124 and the gate 126. Article ejector pins 128 can extend through the first or movable mold half 112 to eject a completed part.

The mold 110 also includes a gas pin assembly, generally indicated at 130. The gas pin assembly 130 includes a one-piece housing, generally indicated at 132. A base portion 134 of the housing 132 is threadedly secured to the second mold half 114 at the interior surface 120 of the second mold half 114 so that the gas pin assembly 130 can be readily removed from the second mold half 114 in the open position of the mold 110. A rubber O-ring 136 is provided about the base portion 134 to seal the housing 132 within the second mold half 114.

The housing 132 also includes a hexagonal head portion 138 so that the assembly 130 can be readily removed from the second mold half 114 in the open position of the mold 110 by a conventional tool (not shown) Details of gas pin assembly 130 can be found in the above-noted patent application.

The hollow hinge 22 as well as two of the posts 34 are formed by the pressurized fluid wherein gas is introduced at one post 34 at one end of the hinge 22, flows through the hinge 22 to hollow it out and thereafter flows into and out a second post 34 at the opposite end of the hinge 22.

While the best mode for carrying out the invention has been described in detail, those familiar with the art to which this invention relates will recognize various alternative designs and embodiments for practicing the invention as defined by the following claims.

What is claimed is:

1. A motor vehicle instrument panel comprising:

a plastic front panel having inner and outer surfaces;

a plastic door adapted to enclose an uninflated air bag, the door having inner and outer surfaces and being interconnected to the front panel at tear seams which allow deployment of the air bag; and a hollow hinge including at least one plastic member extending between, and in a direction generally parallel to, the front panel and the door for hingedly connecting the door to the front panel and to allow the door to swing open and wherein the at least one plastic member bends but does not break away from either the door or the panel to ensure that the door does not separate from the front panel during air bag deployment.

2. The instrument panel as claimed in claim 1 wherein the at least one plastic member is integrally formed at the inner surfaces of the front panel and the door.

3. The instrument panel as claimed in claim 1 further comprising a plastic frame integrally formed on the inner surface of the front panel to enclose the uninflated air bag.

4. The instrument panel as claimed in claim 3 wherein a portion of the frame is hollow.

* * * * *